(12) United States Patent
Holzmann et al.

(10) Patent No.: US 8,742,714 B2
(45) Date of Patent: Jun. 3, 2014

(54) METHOD AND DEVICE FOR TRACKING THE POSITION OF A COMPONENT DRIVEN BY AN ELECTRIC MOTOR

(75) Inventors: Stefan Holzmann, Gaweinstal (AT); Roman Morawek, Vienna (AT); Alexandre Pozzer, Campinas (BR)

(73) Assignee: Continental Automotive GmbH, Hannover (DE)

( * ) Notice: Subject to any disclaimer, the term of this patent is extended or adjusted under 35 U.S.C. 154(b) by 716 days.

(21) Appl. No.: 12/518,625

(22) PCT Filed: Nov. 27, 2007

(86) PCT No.: PCT/EP2007/062848
§ 371 (c)(1),
(2), (4) Date: Dec. 14, 2009

(87) PCT Pub. No.: WO2008/071538
PCT Pub. Date: Jun. 19, 2008

(65) Prior Publication Data
US 2010/0097026 A1   Apr. 22, 2010

(30) Foreign Application Priority Data
Dec. 14, 2006   (DE) .................. 10 2006 059 146

(51) Int. Cl.
*G05B 1/06*   (2006.01)

(52) U.S. Cl.
USPC ...... 318/652; 318/565; 318/400.16; 318/128; 318/466

(58) Field of Classification Search
USPC ......... 318/560, 626, 571, 467, 286, 284, 266, 318/565, 400.34, 400.38, 400.16, 652, 127, 318/721, 823, 369, 466; 235/419; 377/17; 702/163; 340/680; 700/79
See application file for complete search history.

(56) References Cited

U.S. PATENT DOCUMENTS

| | | | |
|---|---|---|---|
| 4,085,890 A | 4/1978 | Kimura et al. | ............ G06F 7/02 |
| 4,223,261 A * | 9/1980 | White | ............ 318/721 |
| 4,514,670 A | 4/1985 | Fassel et al. | ............ H02P 1/22 |
| 4,591,770 A * | 5/1986 | Isobe et al. | ............ 318/565 |
| 4,870,333 A * | 9/1989 | Itoh et al. | ............ 318/286 |

(Continued)

FOREIGN PATENT DOCUMENTS

| | | | |
|---|---|---|---|
| DE | 4412028 A1 * | 10/1995 | |
| DE | 102005006694 | 8/2006 | ............ G01B 7/30 |
| WO | WO2006/086944 A1 | 8/2006 | ............ G01D 5/244 |
| WO | WO 2006086944 A1 * | 8/2006 | |

OTHER PUBLICATIONS

Herbert et al: "A High Efficiency Interface for a Biphase Incremental Encoder With Error Detection" IEEE Transactions on Industrial Electronics, IEEE Service Center, Piscataway, NJ, US, Bd. 40, No. 1, Feb. 1, 1993, pp. 155-156, XP000336949, ISSN: 0278-0046.*

(Continued)

*Primary Examiner* — Eduardo Colon Santana
*Assistant Examiner* — Jorge L Carrasquillo
(74) *Attorney, Agent, or Firm* — King & Spalding L.L.P.

(57) ABSTRACT

In order to track the position of a component driven by an electric motor, wherein rotational movements of the electric motor are detected and used for a position count, deviations from an anticipated position count are determined and added to the position given by the position count as an uncertainty region.

20 Claims, 5 Drawing Sheets

(56) References Cited

U.S. PATENT DOCUMENTS

| | | | |
|---|---|---|---|
| 5,159,248 A | 10/1992 | Kaneko et al. | G05B 11/01 |
| 5,723,959 A * | 3/1998 | Iwata et al. | 318/447 |
| 5,767,646 A * | 6/1998 | Matsumoto | 318/563 |
| 7,787,970 B2 * | 8/2010 | Strasser et al. | 700/56 |
| 2003/0122515 A1 * | 7/2003 | Lutter et al. | 318/466 |
| 2006/0267529 A1 * | 11/2006 | Piefer et al. | 318/432 |

OTHER PUBLICATIONS

German Office Action, DE 102006059146.1-52, 3 pages, Jun. 19, 2007.
International Search Report, PCT/EP2007/062848, 11 pages, Nov. 27, 2007.

* cited by examiner

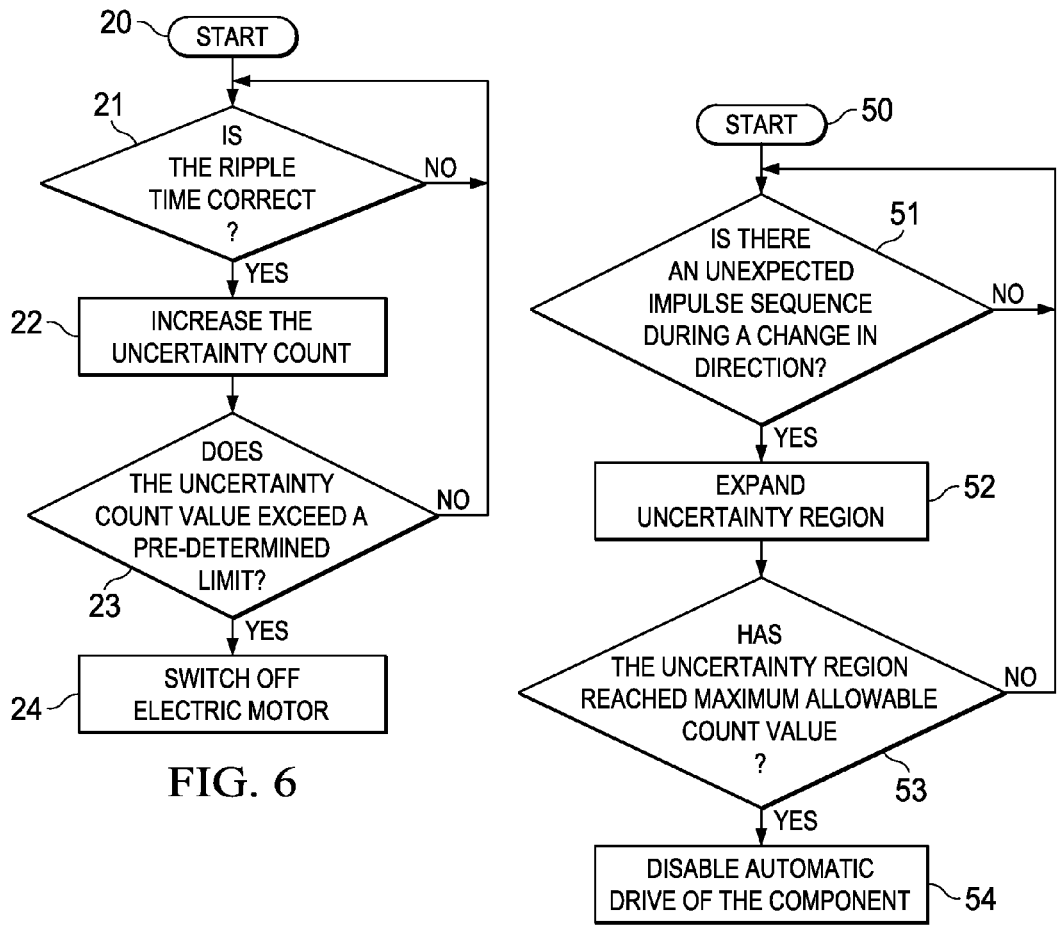
FIG. 6
FIG. 8
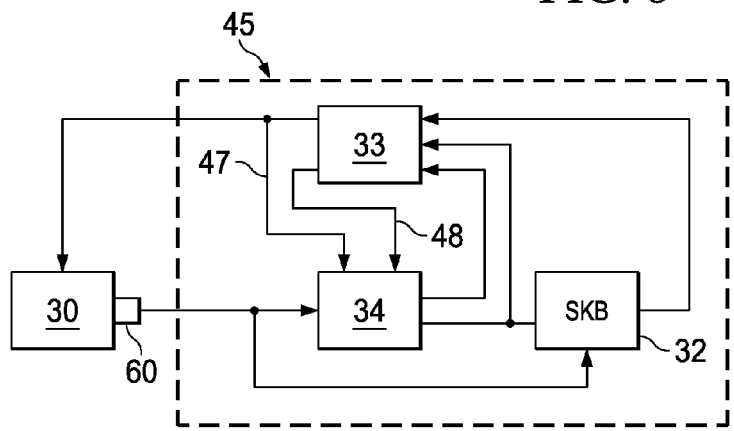
FIG. 9

METHOD AND DEVICE FOR TRACKING THE POSITION OF A COMPONENT DRIVEN BY AN ELECTRIC MOTOR

CROSS-REFERENCE TO RELATED APPLICATIONS

This application is a U.S. National Stage Application of International Application No. PCT/EP2007/062848 filed Nov. 27, 2007, which designates the United States of America, and claims priority to German Application No. 10 2006 059 146.1 filed Dec. 14, 2006, the contents of which are hereby incorporated by reference in their entirety.

TECHNICAL FIELD

The invention relates to a method and a device for tracking the position of a component driven by an electric motor.

BACKGROUND

The tracking, i.e. the continuous detection, of the position of a component driven by an electric motor can be of importance in many areas. In automotive engineering, different motor vehicle components are driven by means of an electric motor such as for example windows, sunroofs, but also seats or sliding doors. In a similar manner, the current position of movable components in buildings, for instance of driven sliding doors, windows, awnings, venetian blinds, etc. is very interesting and must be detected. The position of the driven component in motor vehicles is of particular significance in so far as a jam protection system is usually required in the case of window lifters or sunroofs and, as a result, monitoring the position becomes more important the more the component approaches a closing position because in the case of an increase in the drive force or the closing force, it may close on a jammed object. A further aspect is the fact that in the case of such components such as window lifters or sunroofs, but also motor vehicle seats with a memory function, an automatic movement to the desired position takes place, unless there is a risk of injury, the automatic drive then being stopped and switched over to a manual movement control.

In order to be able to continuously detect the position of window lifters, it is customary to use the sensor means acting on the rotational movements of the electric motor fed by means of the battery of the motor vehicle, namely Hall sensor means or sensor means detecting current ripple signals, it being possible that the mentioned current ripple signals in the motor current were brought about by means of the commutation of the motor. This detection of the current ripple signals and their count are also referred to as the ripple count (current ripple signal). In detail, changes in the current overlapping each other are detected in this process, said changes in the current being generated in the case of commutations in the brushes of the direct current motor. On the other hand, when using Hall sensor means, it is well known that magnetic poles are used at the motor shaft that cause Hall signal impulses in the rotation of the motor shaft in order to detect the position of the motor.

In the case of this detection of the position by means of counting impulses or current peaks it has been proven that errors accumulate in the position count, which must naturally be taken into account in order to prevent putting the user of the specific system at risk. It was hence so far customary in such cases to prevent an automatic movement of the driven component from the start or as an emergency solution to end it after a fixed given number of shorter movements (in both directions) even if the desired position or a known position such as for example an end position, was not reached. A considerable disadvantage of this known solution is that the dynamic behavior of the drive systems is not taken into account. For example, when the movement takes place in a controlled manner and no doubtful situations are detected, it is unjustified and disadvantageous for the functioning of the system if the automatic movements are ended without real necessity, which however takes place in the known solutions. On the other hand, when unfavorable situations arise, for instance in the case of EMC interferences or the fast reversal of movement controls, the system can switch over as fast as possible in the operating mode to an emergency stop or a manual control to prevent possible damage to the system or injuries to users by jamming—in this case it would therefore be wrong and dangerous to wait for a fixed given number of movements up to the switchover.

SUMMARY

According to various embodiments, a method or a device for the continuous monitoring of the positions of the component can be proposed, by which it being possible that on the one hand the safety of persons and of the specific system is ensured and that, on the other hand, the functionality is retained as far as possible and it being possible that the necessary cost should also remain as low as possible.

According to an embodiment, a method for tracking the position of a component driven by an electric motor, rotational movements of the electric motor being detected and used for a position count, is characterized in that deviations from an anticipated position count are determined and added to the position given by the position count as an uncertainty region.

According to a further embodiment, the rotational movement of the electric motor can be detected using Hall sensor means and Hall signal impulses can be used for a position count, deviations from an anticipated impulse pattern being used in order to determine the uncertainty region. According to a further embodiment, the rotational movements of the direct current electric motor can be detected by determining the current ripple signals brought about by means of commutations of the motor, the current ripple signals being used for a position count and deviations from an anticipated ripple signal pattern being used in order to determine the uncertainty region. According to a further embodiment, an automatic drive of the component can be ended on reaching a predetermined maximum uncertainty region and/or can be deactivated for future movements. According to a further embodiment, the uncertainty region can be reset to zero on reaching a predetermined known position of the component. According to a further embodiment, the uncertainty region can be added symmetrically on both sides to the position as a result of the actual position count.

According to another embodiment, in a device for tracking the position of a component driven by an electric motor with a position counter, count signals derived from the rotational movements of the electric motor are fed to the position count, and provision can be made for a deviation detector for determining deviations in the occurrence of the count signals from an expected occurrence based on the previous count signals, which is connected to means for determining an uncertainty region which is added in summation means to the position given by the position count.

According to a further embodiment, the means for determining an uncertainty region may have a joining step in order to add the uncertainty region to the position. According to a further embodiment, provision can be made for Hall sensor means for the derivation of the count signals in the form of Hall signal impulses. According to a further embodiment, provision can be made for current measuring means for determining current ripple signals brought about by means of commutations of the motor of the direct current electric motor that are used as count signals. According to a further embodiment, the current measuring means can be connected to filter means for filtering out the current ripple signals.

According to a further embodiment, the device may comprise a detector for determining when a predetermined maximum value for the width of the uncertainty region is reached. According to a further embodiment, the means for determining the uncertainty region can be connected to at least one predetermined known position of the position detector detecting the component in order to reset the uncertainty region to zero on reaching the predetermined known position. According to a further embodiment, the means for determining the uncertainty region may include an uncertainty signal counter.

BRIEF DESCRIPTION OF THE DRAWINGS

The invention is explained in detail below on the basis of particularly preferred exemplary embodiments, to which they will however not be limited and with reference to the schematic figures of the drawing, in which:

FIG. 6 shows a flow diagram in order to illustrate the procedure when determining such an uncertainty region in the case of the position count on the basis of ripple signals;

FIG. 8 shows a flow diagram similar to FIG. 6 in order to illustrate the procedure in the case of tracking a position on the basis of Hall signal impulses;

FIG. 9 shows a block diagram of a system similar to FIG. 7 with a device for tracking the position, it being possible that Hall signal impulses derived from the electric motor are taken as a basis;

DETAILED DESCRIPTION

Figure 1A:
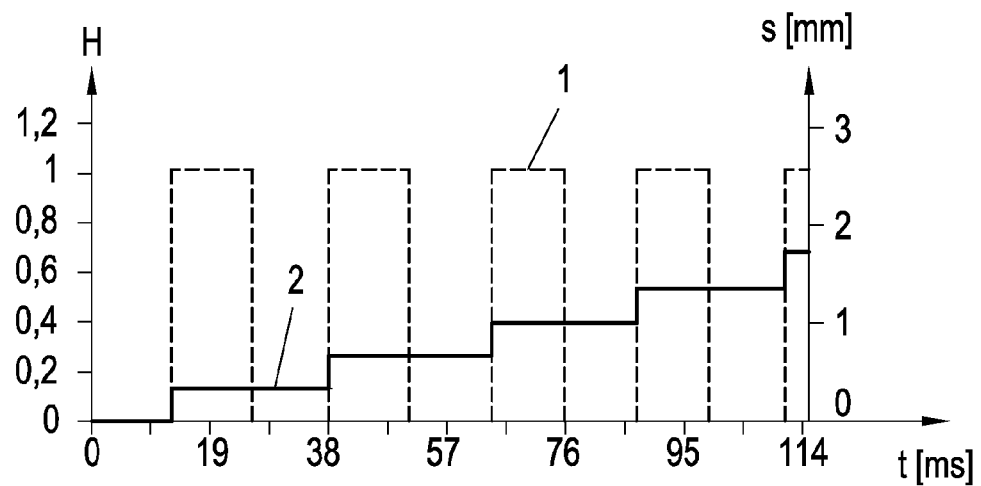
FIGS. 1A and 1B show two diagrams for the illustration of the general procedures when tracking, i.e. continuous monitoring of the position of an electric motor or, accordingly, a component driven by a motor while carrying out a position count.

In accordance with various embodiments, when in the case of the position count dubious situations that cannot be detected with certainty arise, an uncertainty region or interval also referred to as a tolerance range of the "point-wise" position count is added to this, it being possible that for this reason for example—within the meaning of the position count—an individual counter, an "inaccurate" counter or an "uncertainty" counter is used in order to add the uncertainty interval to the position count on the basis of the uncertainty states counted in this way i.e. to the detected position. If as a result, for example a component such as a window lifter of a motor vehicle is driven, in essence in a direction, for example for closing the window, but it being possible that if required the movement is stopped several times and may also be reversed, the impulse or ripple counts are carried out as is customary for the monitoring of a position, it being possible that the counts are obtained depending on the direction of movement in the positive or negative sense. If unclear situations should now arise to the extent that at a place where a further count impulse would actually have to be present, such an impulse is not detected or two such count impulses occur shortly one after another, the position count is then indeed carried out according to the actually detected count signals, but at the same time the uncertainty counter is activated in order to add an uncertainty increment to the position obtained by means of counting in this way—symmetrically positive and negative in a preferred manner. This increment preferably corresponds per detected uncertainty exactly to the extent of the change in the position per count signal or count impulse.

The reasons for the presence of such uncertain or unclear situations in each case depend on the technology used and also on the external circumstances and can for example be that the motor runs too slowly or too fast, abrupt changes take place in the rotational speed of the motor, an external noise results in the supply voltage during the movement of the component such as for example the window or abrupt changes take place in the direction of the movement of the motor. This is the main source for uncertainties in the case of 1 Hall technology. A further uncertainty source is the movement of a motor that was caused externally without control of the motor relay. It is then uncertain, in which direction the motor is being moved.

If for example in the case of the use of the ripple count in a situation, an (additional) current peak is detected without it being expected in this situation, this would point to a sudden great change in the speed of the motor which can hardly be imagined in a drive of components such as for instance in the case of a mechanical window lifter or a sunroof drive. Therefore, this current ripple signal is indeed detected and taken into account in the case of the position count, but at the same time a signal for adding an uncertainty region is produced, in particular an uncertainty impulse for an uncertainty signal counter.

It is of course not necessary in this case to know the reason for such unclear situations such as for example changes in the rotational speed of the motor—these may lie in external forces, noise, etc—, however it is more important that these uncertainty situations are detected and taken into account in the uncertainty region. With each such further uncertainty situation, the uncertainty region is expanded, i.e. the uncertainty signal count increases. When finally a maximum is achieved in the width of the uncertainty region, it being possible that this maximum is predetermined by the circumstances, then an automatic driving movement of the component given up to that point is deactivated so that subsequently a manually controlled movement of the component (of course by means of the drive of the electric motor) comes necessary.

If a fixed, known position such as for instance the final closing position or a fully open position is achieved by the component, then, because this position is exactly known, the uncertainty region in this position is reset to zero. This procedure known per se is usually referred to as standardization or initialization.

For reasons of simple handling and for safety reasons it is in all other respects also advantageous if the uncertainty region, irrespective of whether or not a count signal is apparently detected too much or too little compared to the anticipated pattern, the uncertainty interval is always added in a symmetric manner on both sides to the position detected by the count as the tolerance range.

In this way, with the concept in accordance with an embodiment, the position of the monitored component after the occurrence of uncertain situations is no longer defined by means of an individual point in each case, but by means of an uncertainty interval for each position point. A main advantage in the case of this technology is the fact that the full functionality (before for example the automatic drive movement is deactivated) is maintained over a maximally long time interval. When using this uncertainty interval, the system itself detects when the function is no longer reliable and then limits the functionality, i.e. it then switches off the automatic movement control. In this process, as mentioned, it is not necessary to investigate the reason for the uncertainty situations, so that the costs remain low and for this reason furthermore also because no costly algorithms are required in order to detect the exact specific position each time and no costly correcting algorithms are required that would require highly efficient computing means. All that is necessary is the fact that the system detects that problems have occurred, it being possible that these problems simply lead to the formation of the tolerance range. In addition, the continual updating of this uncertainty region or tolerance range within acceptable boundaries makes the system reliable. In this process, the dynamic changes in the system such as a fast reversal of the rotational direction, external noise, etc. by the same token as the differences between the different system units are taken into account at all times in order to maintain the reliability of the technology in accordance with various embodiments.

FIG. 1 illustrates impulses 1 of the Hall signal H emitted by means of a customary Hall sensor, which has been provided in order to detect the rotational speed of the motor as well as relevant position counter readings S carried out in increments in each Hall signal impulse on the basis of the impulse count as a corresponding motor position or component position 2 over time t.

Figure 1B:
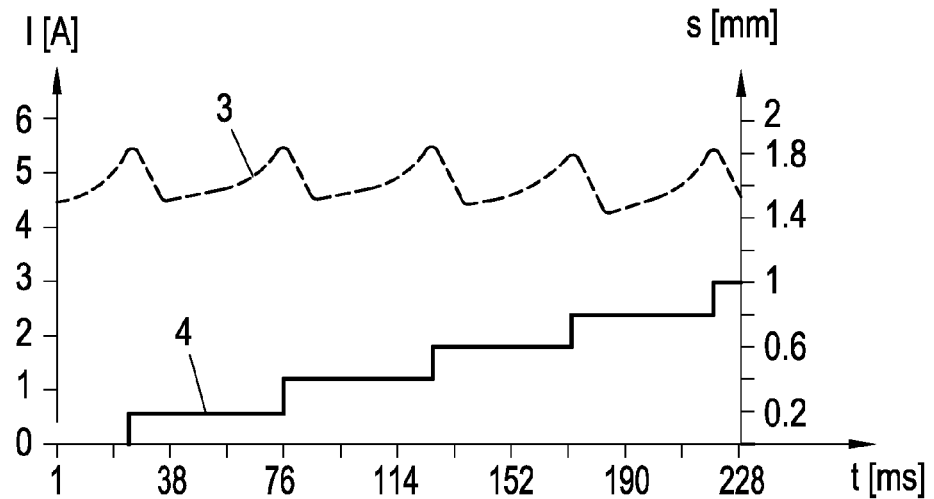

In a similar manner, FIG. 1B illustrates a motor current signal I with ripple signals 3 (peaks or impulses) as well as a relevant position signal 2 or 4 incremented in the case of each ripple signal 3 by one count unit over time t.

Figure 2:
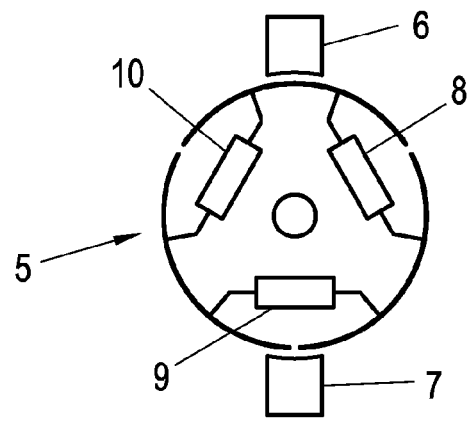
FIG. 2 shows schematically a commutator arrangement with brushes in order to illustrate the derivation of a current ripple signal showing occurring current peaks in the case of the commutation, also referred to as the ripple signal.

Hall sensors are widely used cf. for example DE 9006935 U, so that in this case a further explanation may be unnecessary. Also using the motor current affected by the ripple signals (ripples) for counting and incrementing the position signal in accordance with FIG. 1B is known per se. However, as a precautionary measure, an explanation of the relevant principle will be given in brief on the basis of FIG. 2. A commutator 5 equipped with three segments is for example shown to which two brushes 6, 7 are assigned, whereby in addition resistors 8, 9 and 10 given by means of the motor windings are indicated diagrammatically. The motor current detected by means of the brushes 6, 7 changes more or less suddenly, see the peaks in FIG. 1B, when one commutator segment after the other passes by the specific brush 6 because the combined winding resistance then changes. Accordingly, the ripple signals or peaks in the current curve 3 in accordance with FIG. 1B are a measure for the rotational movement of the electric motor and as a result they may be used in order to count for the continuous detection of the position of the component driven by the motor.

Figure 3:
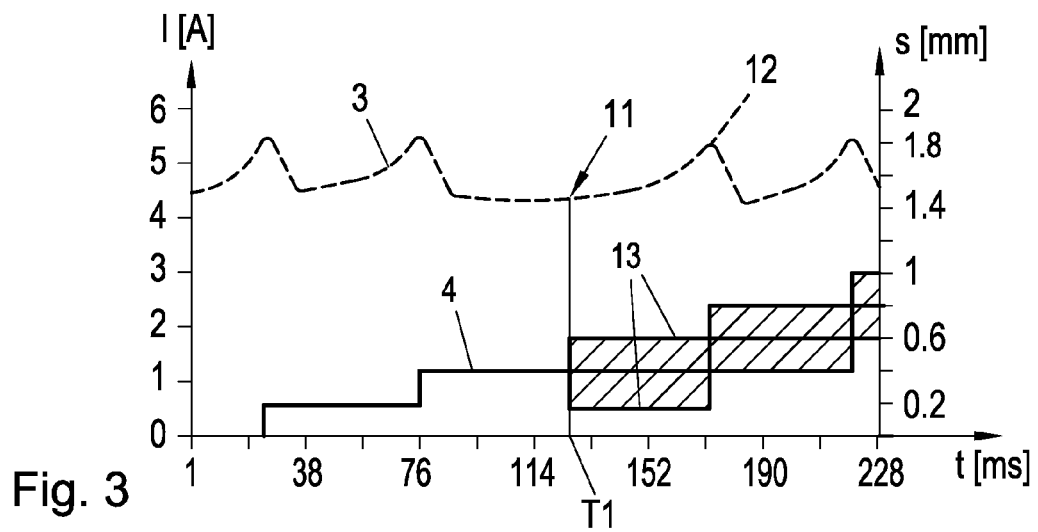
FIGS. 3 and 4 show similar to those in accordance with FIG. 1B, the position monitoring by means of ripple signals, it being possible that different uncertainty situations occur.

After these general introductory explanations, which reflect the prior art known per se, in accordance with an embodiment and taking into account FIGS. 3 to 7, the concept in accordance with various embodiments of detecting and taking into account an uncertainty region in the case of the detection of the current of the motor with a ripple count (i.e. by detecting the ripple signals or peaks in the detected motor current) will now be discussed first in more detail. FIG. 3 shows in a diagram similar to FIG. 1B the case in which the ripple signal is absent in the motor current 3 at a point in time T1, at a position 11, where actually a ripple signal or a peak 12 was to be expected. Accordingly, at this position 11, at a point in time T1, the position count remains without increment, cf. the constantly proceeding count position curve 4 at this position T1. This "uncertainty" is detected as a deviation from the anticipated signal pattern and an uncertainty interval, thus an uncertainty region 13, is in this way added to the position 4 given by the position count from this point in time T1 on both sides of the position curve 4. This uncertainty region 13 is maintained in the case of all other count increments and if required is increased by means of a further increment in a symmetric manner upwards or downwards when other uncertainty situations, i.e. deviations from the anticipated signal pattern (see the curve for the current 3 in FIG. 1B) are determined.

Figure 4:
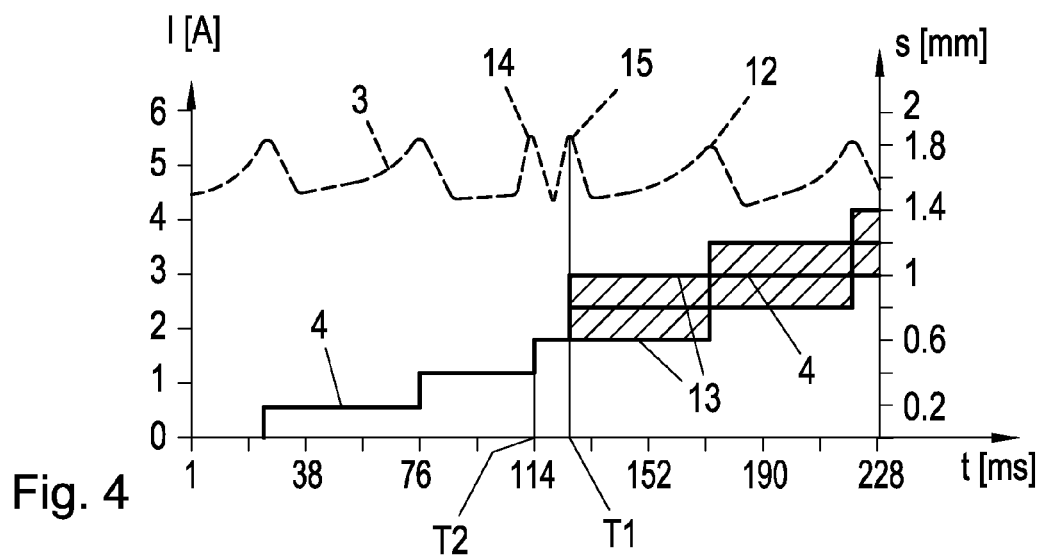

FIG. 4 shows another uncertainty situation in accordance with which at a point in time T2 an unexpected additional current ripple signal 14 occurs so that at this position a position count i.e. a position incrementation, is carried out, cf. the stage given at T2 in the position curve 4. In the case of the immediately following ripple signal 15, which itself corresponds to the anticipated ripple pattern, a further position count is carried out and in this way a position incrementation. Because the ripple impulse 14 only occurs for a short time before the anticipated ripple impulse 15, this ripple impulse 14 is for example accepted as in due form for the position count, but in the case of the immediately following ripple impulse 15 because of the short time interval (T1-T2) the uncertainty count is activated and an uncertainty region 13 is added in a symmetric manner to both sides of the position curve 4.

Figure 5:
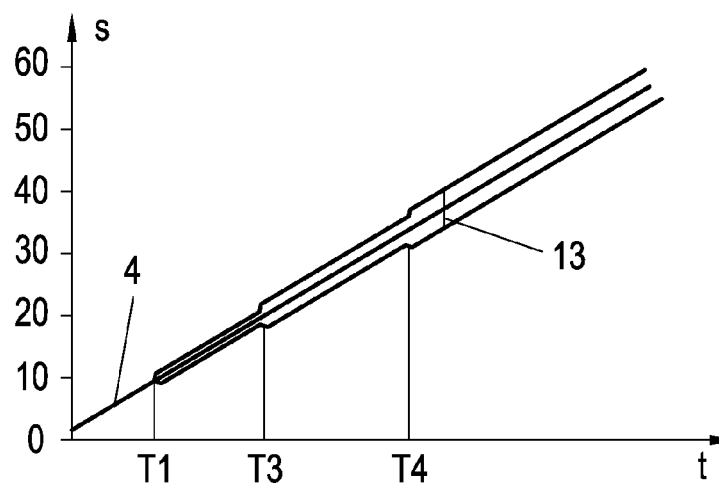
FIG. 5 shows in a diagram, the position detected by the position count over time by illustrating an added tolerance range or an uncertainty region in accordance with various embodiments.

FIG. 5 illustrates the position s detected in this way over a longer period in time as a function of the time t including an uncertainty region 13, which in an example shown in FIG. 5 after a first addition at T1 is expanded another two times at the points in time T3 and T4 according to the uncertainty situations determined at these points in time by means of the corresponding uncertainty count. This expansion of the uncertainty region 13 is permissible until a maximum is reached, in the case of which the tracking of the position aimed at together with additional functions such as for instance in the case of a motor vehicle window with the function of a jam protection would no longer be safe enough.

This sequence is illustrated in the diagram in accordance with FIG. 6, it being possible that after a starting field 20 in an interrogation field 21 it can be requested whether or not the ripple time, i.e. the time between two peaks in the motor current signal, is either too short or too long compared to the last ripple time. In this process, as already shown above in FIG. 4, slight deviations for instance in accordance with a slowing down or an acceleration of the motor are accepted, it being possible that a value can be given for these deviations.

If, in the interrogation field 21 in accordance with FIG. 6, no too long or too short ripple times are determined, i.e. when the ripple peaks correspond to the anticipated signal pattern, one returns to the starting field 20. In the other case, in accordance with a field 22, the uncertainty count is increased by one increment and an uncertainty interval is added to the position curve 4 or the already existing uncertainty region 13 is expanded in a positive and in a negative manner in one increment or interval.

According to a further interrogation field 23, it is then verified whether or not the uncertainty count, i.e. the total width of the uncertainty region 13, is higher than a predetermined limit value. On the other hand, if this is the case, then one returns to the starting field 20. However, if the limit value, the maximum, was achieved, the automatic drive movements are switched off in accordance with a field 24, it being possible that they remain switched off until a given known position is reached in which the uncertainty region 13 is reset to zero.

Figure 7:
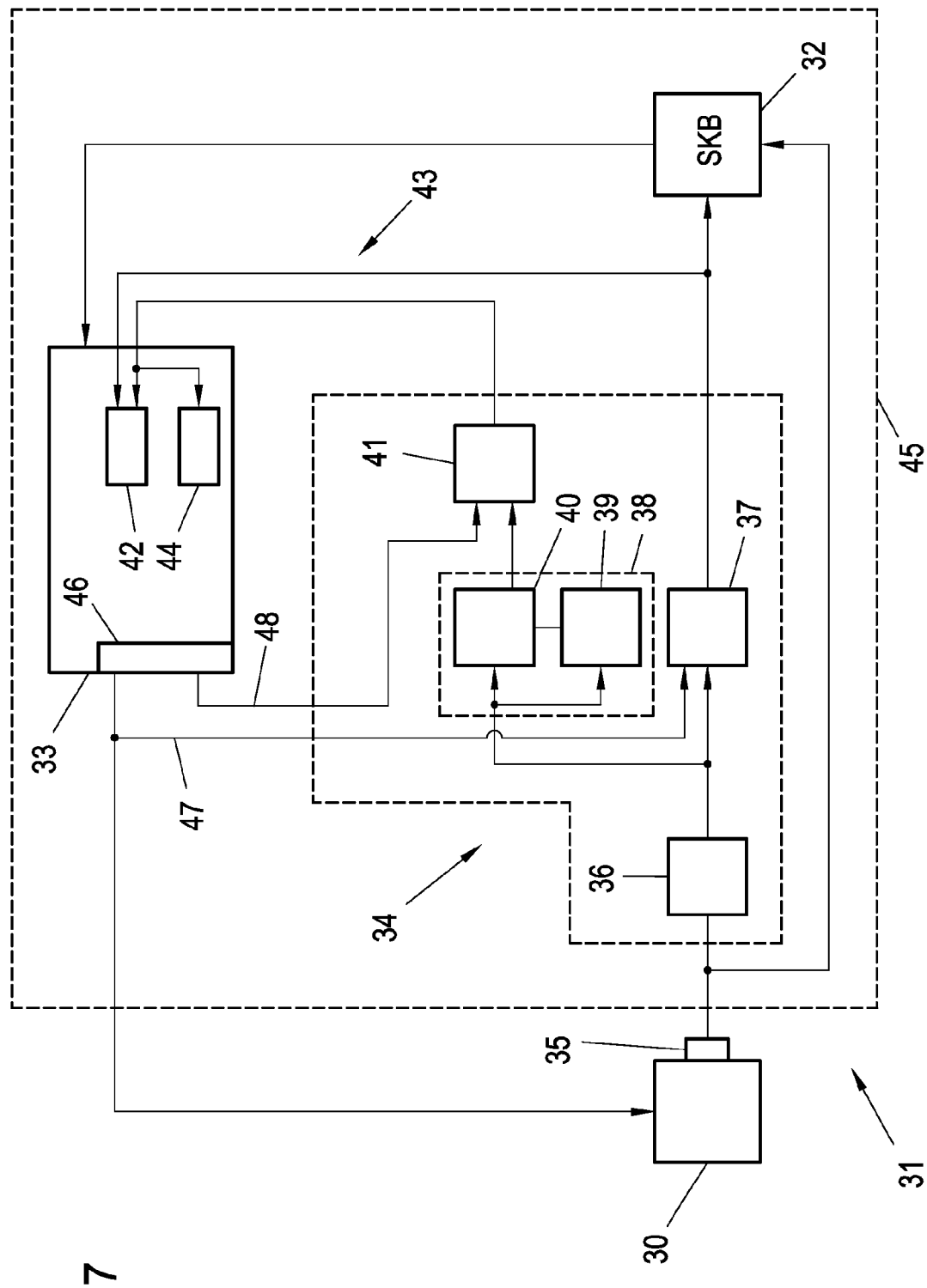
FIG. 7 shows a system for the control of an electric motor provided with a jam protection, with a device embodied in accordance with various embodiments in order to track the position of the electric motor and for this reason the component driven by the motor.

FIG. 7 shows a diagram of an electric motor 30 with an appropriate control system 31 with a closing force limiter (SKB) module 32 as is known from the prior art. The closing force limiter module 32 activates a motor control module 33 by means of which the specific operating concept is implemented. In addition, the control system 31 contains a device 34 for the continuous identification, i.e. tracking the position of the motor 30 and in this way the component driven by this motor 30 such as for example a motor vehicle window (not shown). For this position tracking, current measuring means 35 are allocated to the motor 30, to which filter means 36 in the form of a ripple filter are connected downstream. At the exit of this filter means 36, a signal occurs that represents the motor current curve I or 3 in accordance with FIG. 1B, 3 or 4 and is afterwards sent to a position counter 37, which counts the ripple signals 3 or 12, 14, 15 in the motor current I in order to provide in this way a position count according to the position curve 4 in accordance with FIG. 1B, 3 or 4. This position signal is applied to the SKB module 32 as well as to the motor control module 33.

Furthermore provision has been made for a deviation detector 38 in accordance with FIG. 7, which contains the storage means 39 for storing the ripple signals 3 added last or in general the anticipated signal pattern 39 as well as comparative means 40 for comparing the ripple signals that arrive each time to the pattern stored in the storage means 39. In the case of deviations, an uncertainty signal counter 41 is activated for the purpose of increasing the counter in the sense of an increment of the uncertainty region 13 as described above.

The motor control module 33 contains a joining step 42 in order to add this uncertainty interval to position 4 in FIGS. 3 and 4 in a symmetric manner on both sides in accordance with FIGS. 3 and 4 as described above. Accordingly, this step 42 together with the uncertainty signal counter 41 form the means 43 for determining the uncertainty region 13.

At the same time, the count of the uncertainty signal counter 41 is fed to a maximum detector 44 in order to determine whether or not a predefined maximum value has been reached for the width of the uncertainty region 13. For the rest, the motor control module 33 itself can be embodied in a conventional manner so that in this respect a further explanation is unnecessary. Furthermore, by means of a dashed line 45 it is shown in FIG. 7 that the different components contained within this line can also be implemented by means of a microcomputer (μC), it being possible that in particular the individual units or modules 32 as well as 36-43 can be implemented by means of software modules of the microcomputer 45. In addition, a hardware embodiment with discrete switching components would of course also be feasible.

Furthermore, it is evident from FIG. 7, that a motor command signal is sent by means of the motor control module 33 via an interface 46 and a connection 47, which indicates the direction of rotation in order to enable the position counter 37 to count upwards or in the case of a reversal of the direction of movement of the motor 30, downwards. Such a signal giving the reversal of the direction of movement can in particular be advantageous in the case of embodiments with only one single Hall sensor in order to analyze unclear impulse situations at the time of the reversal of the movement, as will still be explained in detail below by means of FIGS. 10-12. A further connection 48 indicates the control of the uncertainty signal counter 41 where it is reset to zero as soon as a given known position is reached.

The FIGS. 8-12 now to be described refer to an example in which Hall signal impulses for the position tracking are used; cf. also FIG. 1A which was mentioned at the beginning. These Hall signal impulses are released by means of a Hall sensor, which is allocated to the motor drive shaft that is fitted with corresponding magnets, in order to determine as a result of the pole changer the rotational movements of the electric motor that drives a component such as for example a window, a sunroof or a seat of a motor vehicle. Also in this case, uncertainty situations similar to those illustrated in FIGS. 3 and 4 may occur, cf. incidentally also FIG. 12 that is still to be described in more detail.

Accordingly, also in the case of the evaluation of the Hall signal impulses corresponding to the embodiments in FIGS. 3 and 4, a test is carried out in view of the uncertainty situations in the case of missing or double Hall signal impulses and in the given case, an uncertainty region 13 is formed or expanded.

In FIG. 8, a flow diagram similar to a flow diagram in accordance with FIG. 6 where Hall signal impulses are used is illustrated for the position count and the uncertainty count.

In this process, it is requested in this example after a starting field 50 in accordance with an interrogation field 51 whether or not there is an unexpected impulse sequence during a change in direction. If not, one returns to the starting field 50. However, if such an unexpected impulse sequence is detected, the uncertainty signal counter (41 in FIG. 7) is activated in accordance with a field 52 so that an uncertainty region 13 is added or expanded by means of the position count given by position 4 (FIGS. 3 and 4). In the case of a subsequent interrogation, in accordance with the interrogation field 53, a check is carried out in order to determine whether or not the uncertainty signal counter has reached its predetermined maximum count value, i.e. whether or not the uncertainty region 13 has reached its maximum width and if this applies, the automatic movements, i.e. the automatic drive, of the component are disabled in accordance with field 54 in FIG. 8 until an exactly known position, such as an end position of a window is reached. If on the other hand, the maximum uncertainty region has not yet been given (interrogation field 53), one returns to the starting field 50 of the sequence.

FIG. 9 illustrates in a general block diagram of a control system 31 to a large degree similar to that in accordance with FIG. 7, the position count and uncertainty interval determination on the basis of Hall signal impulses, components corresponding to components in accordance with FIG. 7 being referred to with the same reference characters. The block diagram in FIG. 9 is furthermore simplified compared to that in FIG. 7 in so far as the device 34, by means of which the position count as well as the uncertainty signal count takes place by means of the modules 37-41 shown in FIG. 7 is only shown as a general block. Compared to FIG. 7, the ripple filter means 36 are however omitted in FIG. 9. Furthermore, in accordance with FIG. 9, at least one Hall sensor 60 is assigned to the motor 30 instead of the current measuring means 35, and the Hall signal impulses are fed to the device 34 as well as to the SKB module 32. Furthermore, the embodiment and the function of the system 31 correspond to that in accordance with FIG. 7 so that a further description may be superfluous. Also in the case of FIG. 9, an uncertainty signal count is carried out in order to determine the position uncertainty and is fed parallel to the position count to the motor control module 33 where the uncertainty interval is added to the position count until a maximum is reached (see the maximum value detector 44 in FIG. 7). On the other hand, in the case of 47, a motor command regarding the reversal of the rotational direction of the motor is again sent to the device 34 and in the case of 48 a detector module not shown in greater detail, a motor control module 33 that recognizes given known positions, is used to send a corresponding signal to the device 34, in order there to reset the uncertainty signal counter (41 in FIG. 7) to zero.

Figure 10:
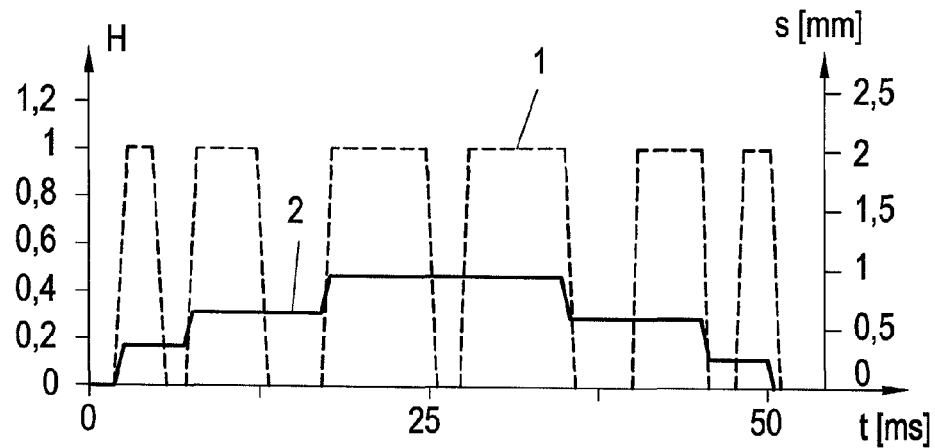
FIGS. 10 and 11 show two typical situations in the case of a reversal of the direction of movement by means of using Hall signal impulses in the position count.
Figure 11:
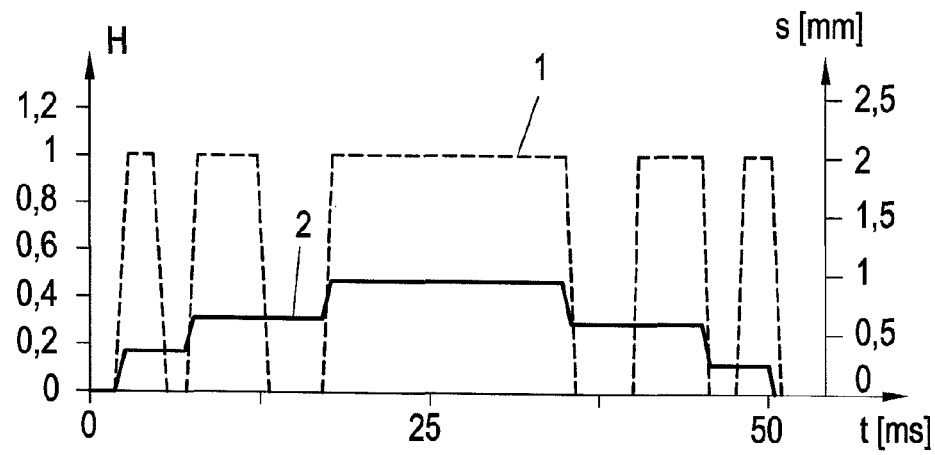

In FIGS. 10 and 11, in a similar manner to the representation in FIG. 1A, Hall signal impulses 1 as well as a position curve 2 are illustrated, but now for the case of a reversal of the rotational direction of the motor. In this process, the Hall signal impulses become wider as the motor slows down (towards the middle of the representation in FIG. 10), it being possible that then a relatively narrow interval between the two broad impulses—according to the reversal of the direction of rotation of the motor—is given, according to which the Hall signal impulses again become shorter because the motor accelerates. This situation may be detected as the reversal of the direction of rotation of the motor, apart from the fact that corresponding information is sent to the device 34 by the motor control module 33 as already mentioned in order to indicate the reversal of the direction of rotation.

The same also applies to the example in accordance with FIG. 11, in which a particularly broad impulse is present in the middle of the diagram—corresponding to a stoppage of the motor—in the case of a reversal of the direction of rotation, before the motor again starts turning in the other direction. Accordingly, during this time, the position curve 2 remains at the given level and then drops stepwise again according to the rotation of the motor in the now opposite direction.

Figure 12:
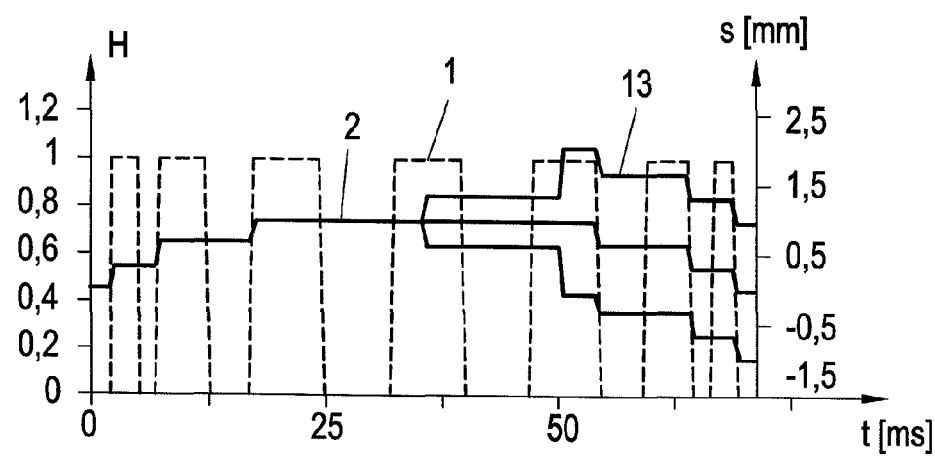
FIG. 12 shows in a diagram similar to the diagrams in accordance with FIGS. 10 and 11, a detection of the position in the case of which an uncertainty situation is determined and an uncertainty interval is accordingly added to the position detected by the count.

FIG. 12 illustrates a situation of the reversal of the direction of rotation, in which the exact point of the reversal of the direction of rotation of the motor cannot be detected because in this range there are more or less three equally broad Hall signal impulses 1. In this way, an uncertainty is given here in the detection of the position and the Hall signal impulses in this range do not for example correspond to the anticipated pattern in accordance with FIG. 10 or 11. Accordingly, the uncertainty signal counter 41 is activated starting with the mean Hall signal impulse, and an uncertainty region 13 that expands in the case of the next Hall signal impulse, is added to the position curve 2 as can be identified in the right-hand part in FIG. 12. Here too, this uncertainty region 13 is added in a symmetrical manner to the position curve 2 in the form of a bandwidth of the position detection on both sides, i.e. above and below. On the other hand, the detected position is also given here in this way by means of the counted position plus/minus the uncertainty interval or the tolerance range.

What is claimed is:

1. A method for tracking a position of a component driven by an electric motor, the method comprising:
    detecting rotational movements of the electric motor with a sensor generating an impulse signal;
    using the impulse signal to increment a position count, the position count corresponding to an expected position of the driven component;
    determining an occurrence of an uncertainty in the position count by detecting deviations of the sensed impulse signal from an expected impulse signal pattern, the expected impulse signal pattern corresponding to historical sensed impulse signals or a reference impulse signal pattern stored in a memory;
    using each occurrence of an uncertainty to increment an uncertainty count corresponding to an uncertainty region;
    combining the uncertainty region with the expected position of the driven component corresponding to the current position count; and
    maintaining both the position count and the uncertainty count for use in estimating the actual position of the driven component.

2. The method according to claim 1, wherein the rotational movements of the electric motor are detected using Hall sensor means generating Hall impulse signals used to increment the position count.

3. The method according to claim 1, wherein:
    the electric motor comprises a direct current electric motor;
    rotational movements of the direct current electric motor are detected by sensing current ripple signals brought about by means of commutations of the motor.

4. The method according to claim 1, wherein when the uncertainty count reaches a predetermined maximum, an automatic drive of the component is at least one of:
    ended or
    deactivated for future movements.

5. The method according to claim 1, wherein the uncertainty count is reset to zero on reaching a predetermined known position of the component.

6. The method according to claim 1, wherein the uncertainty count is added symmetrically on both sides of the position count to estimate the position of the drive component.

7. A device for tracking a position of a component driven by an electric motor, the device comprising:
    a rotation detector sensing an impulse pattern of the electric motor;
    a position counter using the sensed impulse pattern to increment a position count corresponding to an expected position of the driven component;
    deviation detector comparing the sensed impulse pattern of the electric motor to an expected impulse pattern corresponding to historical sensed impulse signals or a reference impulse signal pattern stored in a memory;
    means for calculating an uncertainty region based on the deviations detected by incrementing an uncertainty count with each occurrence of a detected deviation; and
    summation means combining the uncertainty region with the expected position given by the position counter; and
    a position estimator maintaining both the position and the uncertainty region for use in estimating the actual position of the driven component.

8. The device according to claim 7, wherein the means for calculating an uncertainty region has a joining step in order to add the uncertainty region to the position.

9. The device according to claim 7, comprising Hall sensor means for the derivation of the count signals in the form of Hall signal impulses.

10. The device according to claim 7:
    wherein the electric motion comprises a direct electric motor; and further comprising current measuring means for determining current ripple signals brought about by means of commutations of the motor of the direct current electric motor that are used as count signals.

11. The device according to claim 10, wherein the current measuring means are connected to filter means for filtering out the current ripple signals.

12. The device according to claim 7, comprising a detector for determining when a predetermined maximum value for the width of the uncertainty region is reached.

13. The device according to claim 7, wherein the means for determining the uncertainty region are connected to at least one predetermined known position of the position counter detecting the component in order to reset the uncertainty region to zero on reaching the predetermined known position.

14. The device according to claim 7, wherein the means for determining the uncertainty region include an uncertainty signal counter.

15. A method for tracking the position of a component driven by an electric motor, comprising the steps of:
   detecting impulses generated by rotational movements of the electric motor,
   generating a position count from the impulses,
   determining deviations from an expected position count based on deviations between the detected impulses and an expected impulse pattern corresponding to historical detected impulses or a reference impulse pattern stored in a memory;
   for each deviation adding an uncertainty region to an expected position given by the position count;
   combining the uncertainty region with the expected position of the driven component corresponding to the current position count; and
   maintaining both the position count and the uncertainty region for use in estimating an actual position of the driven component.

16. The method according to claim 15, wherein the rotational movement of the electric motor is detected using Hall sensor means and Hall signal impulses are used for generating the position count, and wherein deviations from an anticipated impulse pattern correspond to deviations from the expected position count.

17. The method according to claim 15, wherein the rotational movements of the direct current electric motor are detected by determining the current ripple signals brought about by means of commutations of the motor, the current ripple signals being used for generating the position count wherein deviations from an anticipated ripple signal pattern correspond to deviations from the expected position count.

18. The method according to claim 15, wherein an automatic drive of the component is at least one of ended on reaching a predetermined maximum uncertainty region and deactivated for future movements.

19. The method according to claim 15, wherein the uncertainty region is reset to zero on reaching a predetermined known position of the component.

20. The method according to claim 15, wherein the uncertainty region is added symmetrically on both sides to the position as a result of the actual position count.

\* \* \* \* \*